(12) United States Patent
Anabuki

(10) Patent No.: US 6,990,429 B2
(45) Date of Patent: Jan. 24, 2006

(54) INFORMATION PROCESSING APPARATUS, AND INFORMATION PROCESSING METHOD

(75) Inventor: Mahoro Anabuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 10/738,030

(22) Filed: Dec. 18, 2003

(65) Prior Publication Data

US 2005/0159916 A1    Jul. 21, 2005

(30) Foreign Application Priority Data

Dec. 27, 2002  (JP) .............................. 2002-382490

(51) Int. Cl.
G06F 15/00      (2006.01)

(52) U.S. Cl. .................................................. 702/150
(58) Field of Classification Search ................... None
See application file for complete search history.

(56) References Cited

U.S. PATENT DOCUMENTS

| | | | |
|---|---|---|---|
| 2002/0084974 A1 * | 7/2002 | Ohshima et al. ............ | 345/156 |
| 2002/0103617 A1 | 8/2002 | Uchiyama et al. .......... | 702/150 |
| 2003/0144813 A1 | 7/2003 | Takemoto et al. .......... | 702/153 |
| 2003/0182072 A1 | 9/2003 | Satoh et al. ................. | 702/95 |

FOREIGN PATENT DOCUMENTS

| | | | |
|---|---|---|---|
| JP | 06-028451 | * | 4/1994 |
| JP | 6-105232 | | 4/1994 |
| JP | 3074943 | | 6/2000 |
| JP | 3122099 | | 10/2000 |
| JP | 2001-285715 | | 10/2001 |
| JP | 3247307 | | 11/2001 |

* cited by examiner

*Primary Examiner*—Michael Nghiem
*Assistant Examiner*—Cindy D. Khuu
(74) *Attorney, Agent, or Firm*—Fitzpatrick, Cella, Harper & Scinto

(57) ABSTRACT

To correct the field angle of an image sensing device which senses an image of a real space that includes a feature point whose position on the real space is known, the position of the feature point (real marker position) in the image of the real space sensed by the device is detected. Then, the feature point position (virtual marker position), which is seen when the real space is viewed from a virtual viewpoint specified by the measured position, orientation, and field angle of the device, in that image is calculated. A correction amount of the position and/or a correction amount of the orientation of the device are/is calculated so as to minimize a deviation between the real and virtual marker positions in the image. The correction amount of the field angle of the device is calculated in accordance with the minimized deviation or the correction amount of the position.

14 Claims, 10 Drawing Sheets

FIG. 2
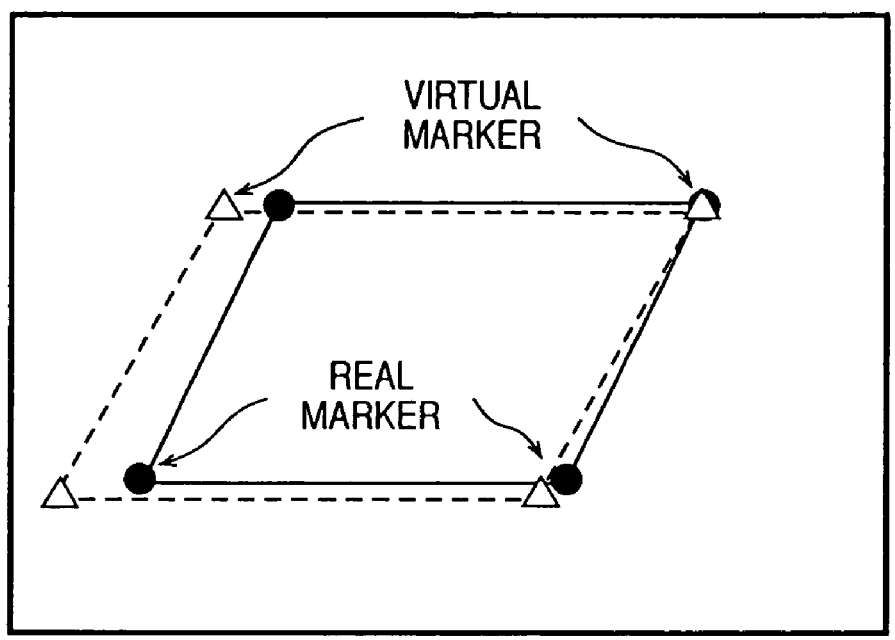
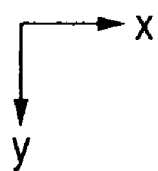

FIG. 3
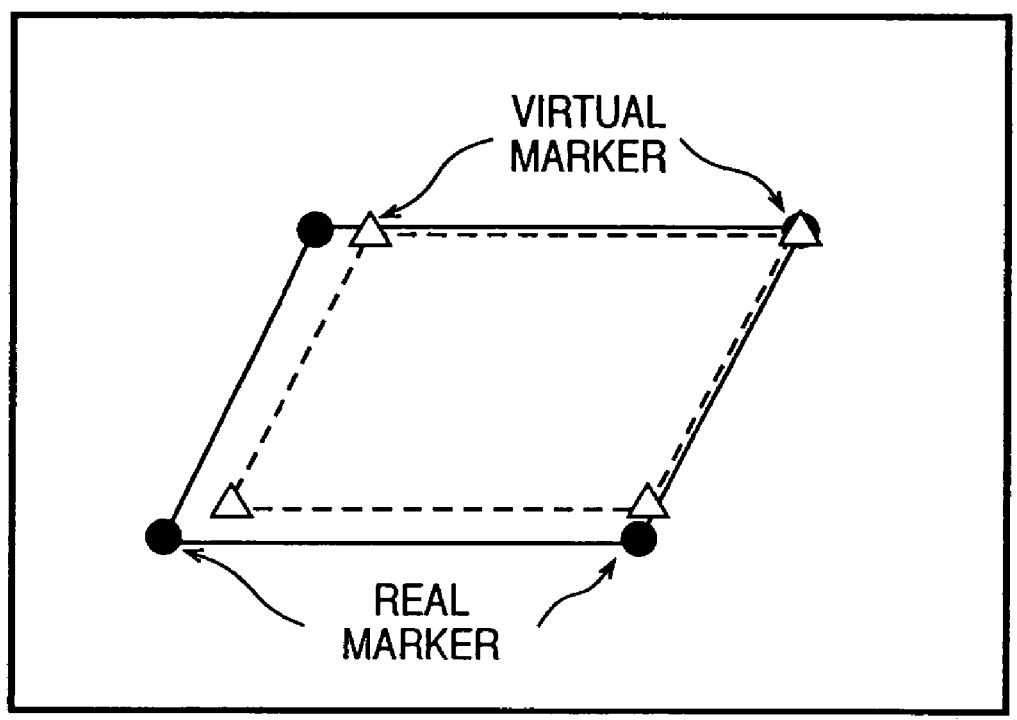
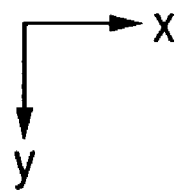

INFORMATION PROCESSING APPARATUS, AND INFORMATION PROCESSING METHOD

FIELD OF THE INVENTION

The present invention relates to an apparatus and method for correcting field angle information of an image sensing device from a sensed image of real space which includes feature points whose positions on the real space are known.

BACKGROUND OF THE INVENTION

In recent years, studies about mixed reality that aims at seamless joint of real and virtual spaces have been extensively made. The studies about mixed reality aim at coexistence of a virtual reality world which can be conventionally experienced in only a situation isolated from the real space, and the real space, and have attracted attention as a technique that augments virtual reality. As applications of such mixed reality, new fields different in quality from conventional virtual reality such as a medical assistant application that presents the state in the body of a patient to a doctor as if it were seen through, an operation assistant application that superimposes the assembling order of a product on real objects in a factory, and the like are expected.

A video see-through AR (Augmented Reality) system as one of presentation methods of such mixed reality generates a mixed reality image by superposing and compositing a real space image obtained by capturing a real space in real time using a camera or the like, and a virtual space image which has the same field angle as that of the camera and is obtained by a computer, and displays the generated mixed reality image on an image display device.

Some conventional techniques, which use a camera whose zoom ratio can be optically changed as the camera for capturing the real space in this system, have been disclosed (for example, see Japanese Patent Laid-Open Nos. 6-105232 and 2001-285715, and Japanese Patent Nos. 3,122,099, 3,074,943, and 3,247,307).

A change in zoom ratio of the camera changes the photographing field angle (=focal length). Therefore, in the above prior arts, the photographing field angle of the camera used to sense a real space is acquired in real time, and is used upon generating a virtual space image, so as to match the field angle of the camera used to sense the real space image and that used upon generating a virtual space image. As acquisition means of the field angle of the camera, it is a common practice to measure the lens state such as a rotation angle or the like of a zoom lens and to acquire the field angle of the camera according to a predetermined conversion model based on the measured value.

Note that the above prior arts implement the mixed reality presentation method using the camera whose zoom ratio can be changed under the condition that the field angle of the camera acquired by the acquisition means is correct. However, the acquired field angle of the camera does not always match that of an actual camera due to measurement errors of the lens state, errors of the conversion model from the lens state of the photographing field angle of the camera, and the like.

In the video see-through AR system, the size of the real space image sensed by the camera may change when the real space image is captured into a computer and is converted into digital data. Hence, the field angle of an image sensed by the camera is slightly different from that of the real space image to be composited with the virtual space image. Since a change in size independently takes place in the vertical and horizontal directions of the image, the images may have different field angles in their vertical and horizontal directions. When such field angle difference is not negligible, conversion from the lens state into the field angle of the real space image to be composited must be done in place of conversion from the lens state into the photographing field angle of the camera. However, it is difficult to model this conversion.

SUMMARY OF THE INVENTION

The present invention has been made in consideration of the above problems, and has as its object to appropriately correct field angle information of an image sensing device on the basis of feature points in a sensed image.

In order to achieve the above object, for example, an information processing apparatus of the present invention comprises the following arrangement.

That is, an information processing apparatus for correcting a field angle of an image sensing device, which senses an image of a real space that includes a feature point whose position on the real space is known, comprising: position detection unit adapted to detect a position of the feature point included in the image of the real space sensed by the image sensing device in that image; measurement unit adapted to measure a position, orientation, and field angle of the image sensing device; position calculation unit adapted to set a virtual viewpoint specified by the position, orientation, and field angle measured by the measurement unit, and calculating a position of the feature point, which is seen when the real space is viewed from that viewpoint, in the image; first correction amount calculation unit adapted to calculate a correction amount of the position and/or a correction amount of the orientation of the image sensing device to minimize a deviation between the position detected by the position detection unit and the position calculated by the position calculation unit in the image sensed by the image sensing device; and second correction amount calculation unit adapted to calculate a correction amount of the field angle of the image sensing device in accordance with the deviation minimized by the first correction amount calculation unit or the correction amount of the position of the image sensing device calculated by the first correction amount calculation unit.

In order to achieve the above object, for example, an information processing method of the present invention comprises the following arrangement.

That is, an information processing method for correcting field angle information of an image sensing device from a sensed image of a real space which includes a feature point whose position on the real space is known, comprising: a position detection step of detecting a position of the feature point included in the image of the real space sensed by the image sensing device in that image; a measurement step of measuring a position, orientation, and field angle of the image sensing device; a position calculation step of calculating the position of the feature point in the image of the real space on the basis of position information, orientation information, and field angle information obtained in the measurement step, and the position of the feature point; and a field angle information correction step of correcting the field angle information measured in the measurement step to match the position of the feature point calculated in the position calculation step with the position of the feature point detected in the position detection step.

In order to achieve the above object, for example, an information composition apparatus of the present invention comprises the following arrangement.

That is, an image composition apparatus which composites a real space image obtained by sensing a real space, and a virtual space image generated by a computer or the like, comprising: an image sensing unit which is used to sense the real space image, and has a variable zoom ratio; an image capture unit which captures the real space image; a position/orientation measuring unit which acquires position data and orientation data of a photographing viewpoint of the image sensing unit; a lens state acquisition unit which acquires lens state data of the image sensing unit; a marker data storage unit which holds marker data used to specify a feature point set on the real space; a field angle calculation unit which calculates field angle data of the image sensing unit from the lens state data; a position/orientation/field angle correction unit which corrects the field angle data using the real space image, the marker data, the position data, and the orientation data; a space data storage unit which holds space data that defines a virtual space; an image generation unit which generates the virtual space image using the space data, the position data, the orientation data, and the field data; an image composition unit which generates a mixed reality space image by compositing the real space image and the virtual space image; and an image display unit which displays the mixed reality space image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view for explaining a method of calculating a correction amount of field angle data using the positions of virtual and real markers on the real space image;

FIG. 3 is a view for explaining the method of calculating a correction amount of field angle data using the positions of virtual and real markers on the real space image in a case different from that in FIG. 2;

DETAILED DESCRIPTION OF THE PREFERRED EMBODIMENTS

Preferred embodiments of the present invention will now be described in detail in accordance with the accompanying drawings.

[First Embodiment]

Figure 1:
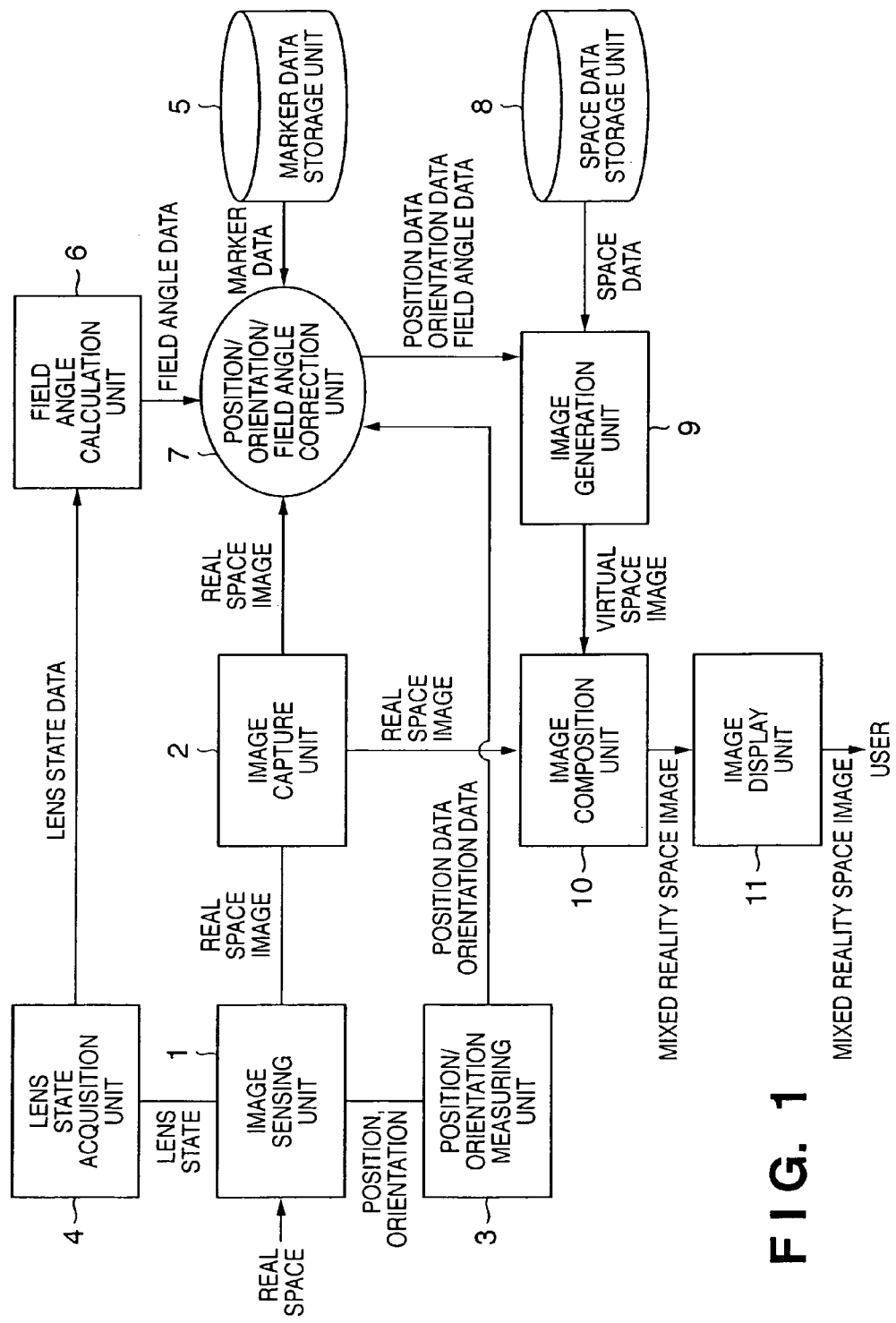
FIG. 1 is a block diagram showing the functional arrangement of an information processing apparatus according to an embodiment of the present invention, which is used to provide, to the user, a composite image of a real space image sensed using a camera whose zoom ratio is variable, and a virtual space image generated on the basis of the position, orientation, and field angle of that camera.

FIG. 1 is a block diagram showing the functional arrangement of an information processing apparatus according to an embodiment of the present invention, which is used to provide, to the user, a composite image of a real space image sensed using a camera whose zoom ratio is variable, and a virtual space image generated on the basis of the position, orientation, and field angle of that camera.

Reference numeral 1 denotes an image sensing unit whose zoom ratio is variable. The image sensing unit 1 is, for example, an image sensing device represented by a camera with an optical zoom lens. The image sensing unit 1 senses an image of a real space in the visual axis direction at its viewpoint position to obtain a real space image. The zoom ratio of the image sensing unit 1 can be optically changed by user's operation (e.g., an operation of a switch mounted on the image sensing unit 1). The real space image obtained by the image sensing unit 1 is output to an image capture unit 2.

Reference numeral 2 denotes an image capture unit which is a device represented by, e.g., a video capture card or the like. The image capture unit 2 converts the real space image received from the image sensing unit 1 into a format suited to a position/orientation/field angle correction unit 7 and image composition unit 10, and outputs the converted real space image to the position/orientation/field angle correction unit 7 and image composition unit 10.

Reference numeral 3 denotes a position/orientation measuring unit, which is a position/orientation sensor such as a magnetic sensor, inertia sensor, or the like. The position/orientation measuring unit 3 measures the position and orientation of a photographing viewpoint of the image sensing unit 1 on the real space, and outputs the measured values as position and orientation data to the position/orientation/field angle correction unit 7. Note that an origin position and coordinate system are set in advance on the real space, and the position/orientation measuring unit 3 measures the position (x, y, z) and orientation (roll angle, pitch angle, and yaw angle) of the image sensing unit on the set coordinate system.

Note that the position/orientation measuring unit 3 may measure only the orientation of a photographing viewpoint of the image sensing unit 1, and may output only the orientation data to the position/orientation/field angle correction unit 7. In this case, the unit 3 internally holds the position data of a predetermined photographing viewpoint of the image sensing unit 1, and outputs it to the position/orientation/field angle correction unit 7. Conversely, the position/orientation measuring unit 3 may measure only the position of a photographing viewpoint of the image sensing unit 1, and may output only the position data to the position/orientation/field angle correction unit 7. In this case, the unit 3 internally holds the orientation data of a predetermined photographing viewpoint of the image sensing unit 1, and outputs it to the position/orientation/field angle correction unit 7. Furthermore, the position/orientation measuring unit 3 may internally hold the position data and orientation data of a predetermined photographing viewpoint of the image sensing unit 1 and may output them to the position/orientation/field angle correction unit 7 without measuring the position and orientation of the photographing viewpoint of the image sensing unit 1.

Reference numeral 4 denotes a lens state acquisition unit which is, e.g., an encoder. The lens state acquisition unit 4 measures the lens state of the image sensing unit 1, and outputs the measured value as lens state data to a field angle calculation unit 6. The lens state is, for example, the rotation angle of a zoom lens, and is measured by attaching the lens state acquisition unit 4 to the zoom lens of the image sensing unit 1, and measuring the rotation angle of the zoom lens.

Reference numeral 5 denotes a marker data storage unit which comprises, e.g., a hard disk, memory, or the like, and serves as a storage device for storing and holding marker data (to be described later) used to specify markers. Note that the markers are feature points set on the real space, and are specified by the coordinate positions on the coordinate system set on the real space and their colors. Data used to specify each marker is the marker data, which consists of three-dimensional (3D) coordinate data of the position, where that marker is set, on the coordinate system, and attribute data indicating the color of the marker. The marker storage unit 5 stores one or more marker data corresponding to markers which are actually set on the real space, and outputs the data to the position/orientation/field angle correction unit 7.

The field angle calculation unit 6 is a software module which runs on, e.g., a computer. The field angle calculation unit 6 calculates the photographing field angle of the image sensing unit 1 in accordance with a predetermined conversion model on the basis of the lens state data received from the lens state acquisition unit 4, and outputs the calculated photographing field angle as field angle data to the position/orientation/field angle correction unit 7.

The position/orientation/field angle correction unit 7 is a software module which runs on, e.g., a computer. The position/orientation/field angle correction unit 7 corrects position data and/or orientation data first using the real space image received from the image capture unit 2, the field angle data received from the field angle calculation unit 6, marker data received from the marker data storage unit 5, and the position and orientation data of the image sensing unit 1 on the real space, which are obtained by the position/orientation measuring unit 3.

Figure 6A:
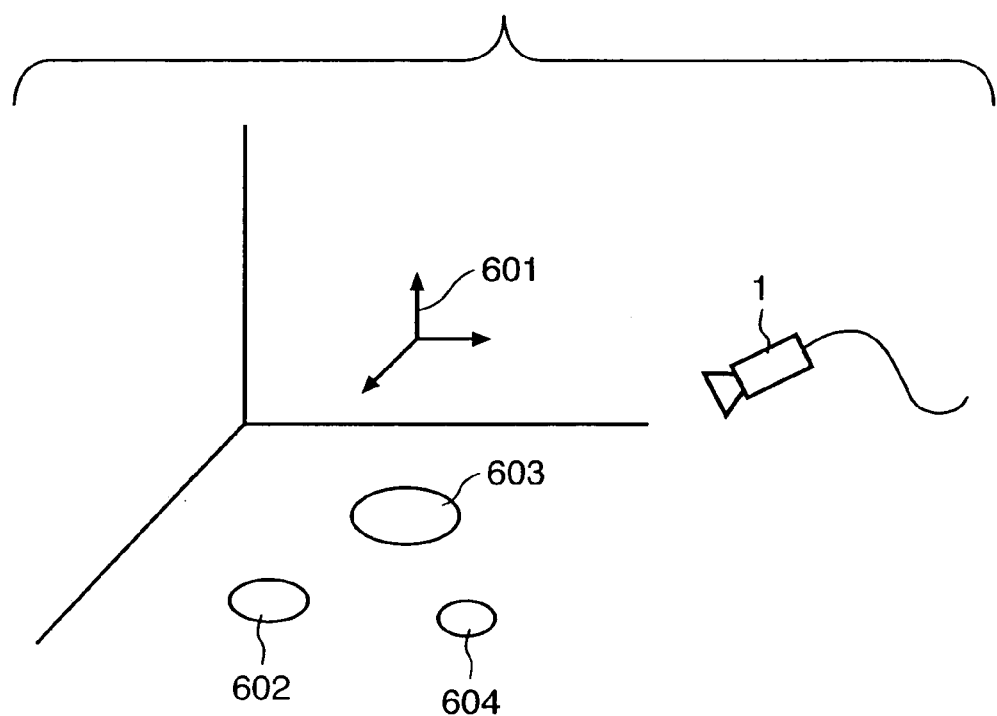
FIG. 6A shows a state wherein markers which are set on the real space are sensed by the image sensing unit 1.
Figure 6B:
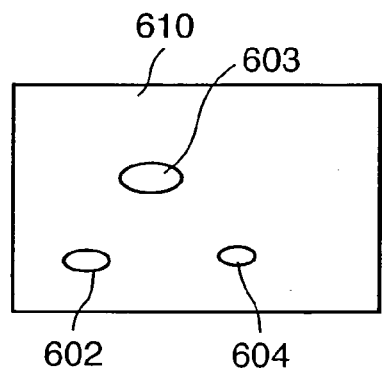
FIG. 6B shows a real space image sensed by the image sensing unit 1.

In this correction process, the positions (to be referred to as real marker positions hereinafter) of the markers, which are included in the real space image received from the image capture unit 2, on the real space image are detected. FIG. 6A shows a state wherein markers set on the real space are sensed by the image sensing unit 1, and FIG. 6B shows a real space image sensed by the image sensing unit 1. In FIGS. 6A and 6B, three markers are set. However, the following description is not limited to such specific number of markers.

In FIG. 6A, reference numeral 601 denotes a coordinate system set on the real space. The position and orientation of the image sensing unit 1 and the position of each marker are expressed according to this coordinate system 601. When the image sensing unit 1 senses markers 602 to 604 set on the real space, a real space image 610 includes images of the markers 602 to 604, as shown in FIG. 6B. Hence, the positions of the markers 602 to 604 on this image 610 are detected.

Figure 7:
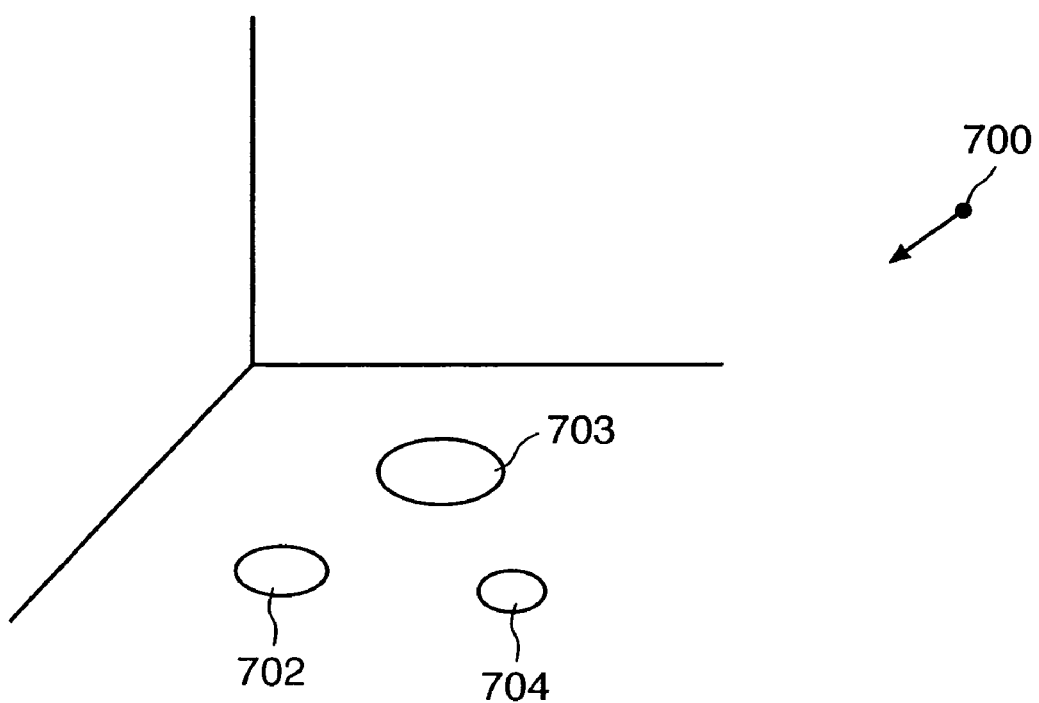
FIG. 7 is a view for explaining a virtual space viewed from a virtual viewpoint.

On the other hand, the positions (to be referred to as virtual marker positions hereinafter) of the markers on the real space image, which are viewed from a virtual viewpoint specified by the position and orientation of the image sensing unit 1 obtained from the position/orientation measuring unit 3, and the field angle of the image sensing unit 1 obtained from the field angle calculation unit 6 are calculated. FIG. 7 is a view for explaining the virtual space viewed from that virtual viewpoint. Note that a coordinate system on the virtual space matches that on the real space, and an origin position also matches. Hence, the position on the real space can be directly used on the virtual space. Using 3D coordinate data of the markers 602 to 604, markers 702 to 704 can be set at the same positions as those of the markers 602 to 604 on the virtual space. If the position, orientation, and field angle of a virtual viewpoint 700 completely match those of the image sensing unit 1, the positions of the markers 702 to 704 in an image obtained upon sensing the virtual space at that virtual viewpoint 700 match those of the markers 602 to 604 in the image 610.

However, as described above, the real marker positions and virtual marker positions in the real space image do not always match, since the position and orientation obtained from the position/orientation measuring unit 3 do not always match an actual position and orientation, the field angle obtained from the field angle calculation unit 6 does not always match an actual field angle, the field angle of an image changes since the real space image obtained by the image sensing unit 1 has undergone various processes, and so forth.

Hence, the position and orientation data obtained from the position/orientation measuring unit 3 are corrected to match the real marker positions with the virtual marker positions, i.e., to minimize a deviation between the real and virtual marker positions. This correction process will be described in detail later. If it is proved in advance that the position and orientation data received from the position/orientation measuring unit 3 have sufficiently high precision, the position/orientation/field angle correction unit 7 may skip this correction process.

The position/orientation/field angle correction unit 7 calculates a deviation between the real and virtual marker positions (an error of the above position/orientation correction process ("an error of position/orientation measurement" if correction is skipped, but such error will also be referred to as "an error of the position/orientation correction process" hereinafter)) again using the corrected position and orientation data, the real space image received from the image capture unit 2, the field angle data received from the field angle calculation unit 6, and the marker data received from the marker data storage unit 5.

In this case, when the error of the position/orientation correction process is larger than a given reference, the position/orientation/field angle correction unit 7 corrects the field angle data. Such process is required since it is determined that the error between the real and virtual marker positions is caused by that between the field angle used to sense the real space image and that obtained from the field angle calculation unit 6. When a component of the correction amount of the position data in a direction perpendicular to an image plane is larger than a given reference, i.e., when the position and orientations are corrected by moving the viewpoint position back or forth in the visual axis direction, the field angle data is also corrected. Such process is required since it is determined that an error between the field angle used to sense the real space image and that obtained by the field angle calculation unit 6 is minimized by moving the viewpoint position although it is present.

More specifically, the field angle correction process calculates a correction amount of field angle data to match the real marker positions with the virtual marker positions, i.e., to minimize the error between the real and virtual marker positions, and adds that correction amount to the field angle data obtained from the field angle calculation unit 6 to correct the field angle data.

When the measured value of the error of the position/orientation correction process is smaller than a given reference, and when a component of the correction amount of the position data in a direction perpendicular to an image panel is smaller than a given reference, the position/orientation/field angle correction unit 7 stores the correction values of the field angle data at that time, and outputs the field angle data to an image generation unit 9 together with the corrected position and orientation data.

After that, until the field angle received from the field angle calculation unit 6 changes, i.e., until new field angle data with a value different from that of the field angle data already received by the position/orientation/field angle correction unit 7 is input from the field angle calculation unit 6 to the position/orientation/field angle correction unit 7, the unit 7 continuously outputs the field angle data corrected using the stored correction values of the field angle data, and the corrected position and orientation data to the image generation unit 9.

Reference numeral 8 denotes a space data storage unit which comprises, e.g., a hard disk, memory, or the like. The space data storage unit 8 holds data (space data) required to generate a virtual space image, i.e., data required to generate images of objects on the virtual space, e.g., the shape data, position data, and the like of objects on the virtual space, and outputs the space data to the image generation unit 9.

The image generation unit 9 is a software module, which runs on, e.g., a computer. The image generation unit 9 generates a virtual space image using the corrected position, orientation, and field angle data received from the position/orientation/field angle correction unit 7, and the space data received from the space data storage unit 8. This virtual space image is an image of the virtual space obtained when a virtual space defined by the space data is sensed at a position and orientation determined by the position and orientation data and at a field angle determined by the field angle data. The generated virtual space image is output to the image composition unit 10.

The image composition unit 10 is a software module, which runs on, e.g., a computer. The image composition unit 10 generates a mixed reality space image by compositing the real space image received from the image capture unit 2 and the virtual space image received from the image generation unit 9. This mixed reality space image is formed by superposing the virtual space image on the real space image.

Reference numeral 11 denotes an image display unit, which is an image display device represented by a head-mount type liquid crystal display, a CRT display attached to a base, or the like. The image display unit 11 receives the mixed reality space image from the image composition unit 10, and displays it, thus presenting the mixed reality space image to the user and allowing the user to experience mixed reality.

Figure 4:
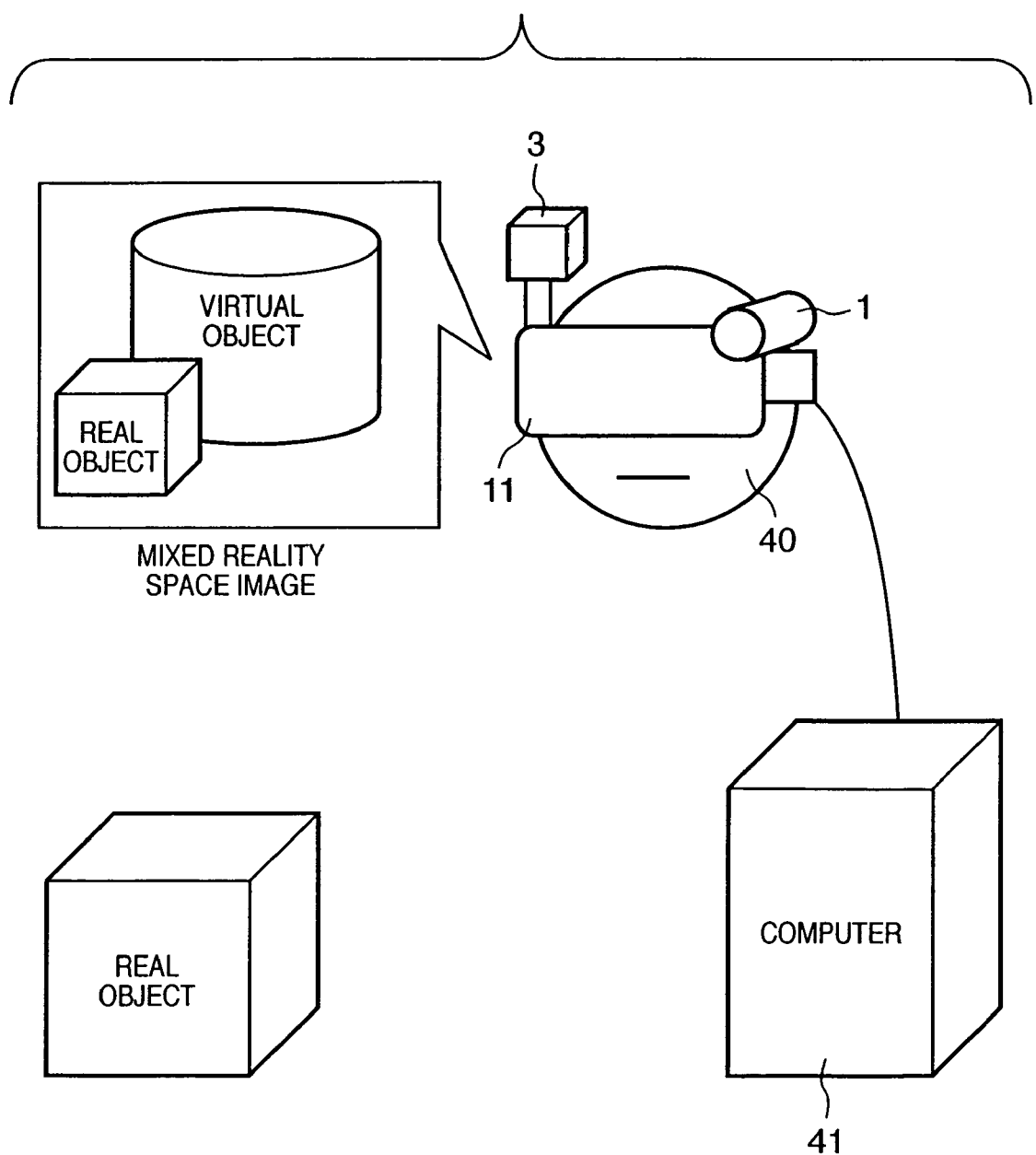
FIG. 4 shows a system of an information processing apparatus in which a user 40 wears on his or her head a device that integrates an image sensing unit 1, position/orientation measuring unit 3, and image display unit 11, and a composite image (mixed reality space image) of a real space image sensed by the image sensing unit 1 and a virtual space image generated by a computer 41 that executes respective software modules is displayed on the image display unit 11 which is located in front of the eyes of the user 40.
Figure 5:
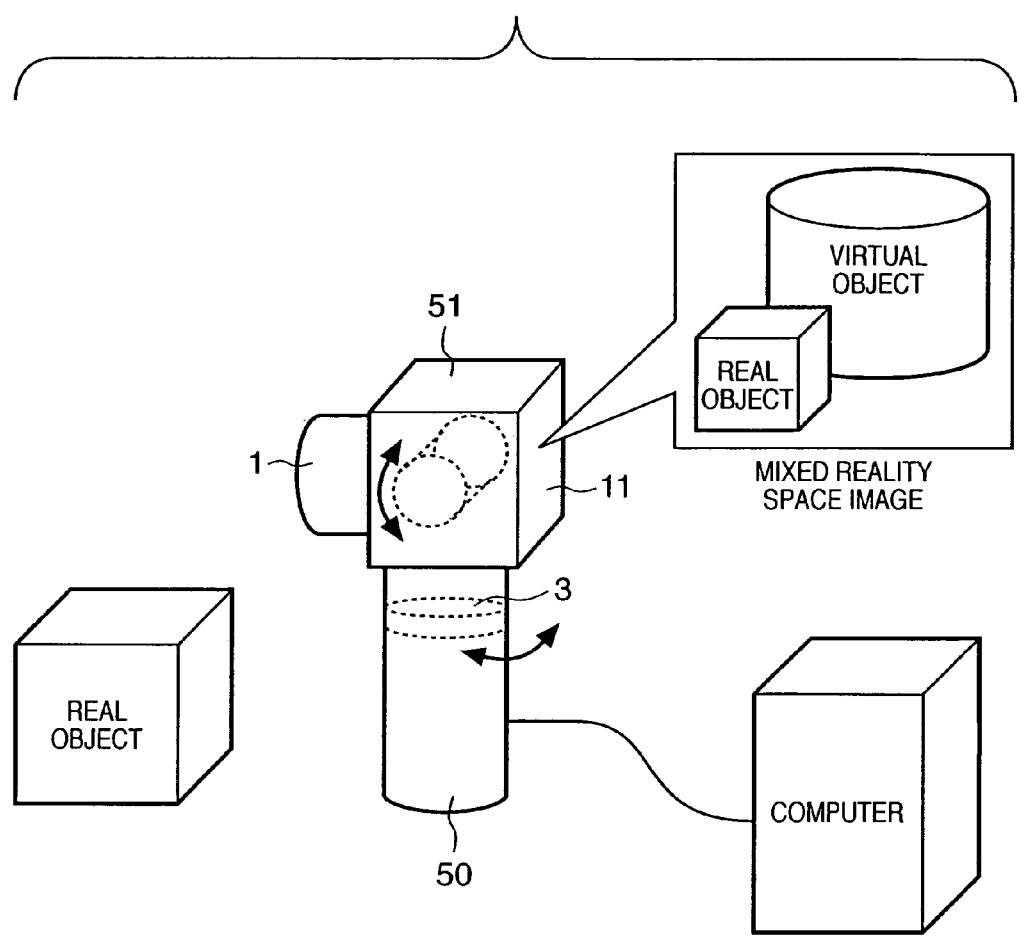
FIG. 5 shows a system of an information processing apparatus in which a portion 51 that integrates an image sensing unit 1 and image display unit 11 is attached to a column 50 to be rotatable in the directions of arrows, and a composite image (mixed reality space image) of a real space image sensed by the image sensing unit 1 and a virtual space image generated by a computer 41 that executes respective software modules is displayed on the image display unit 11 which is attached to the portion 51.

The information processing apparatus with the above arrangement may have a system either in FIG. 4 or 5. FIG. 4 shows a system of the information processing apparatus in which a user 40 wears on his or her head a device that integrates the image sensing unit 1, position/orientation measuring unit 3, and image display unit 11, and a composite image (mixed reality space image) of a real space image sensed by the image sensing unit 1 and a virtual space image generated by a computer 41 that executes respective software modules is displayed on the image display unit 11 which is located in front of the eyes of the user 40.

FIG. 5 shows a system of the information processing apparatus in which a portion 51 that integrates the image sensing unit 1 and image display unit 11 is attached to a column 50 to be rotatable in the directions of arrows, and a composite image (mixed reality space image) of a real space image sensed by the image sensing unit 1 and a virtual space image generated by a computer 41 that executes respective software modules is displayed on the image display unit 11 which is attached to the portion 51.

Figure 8:
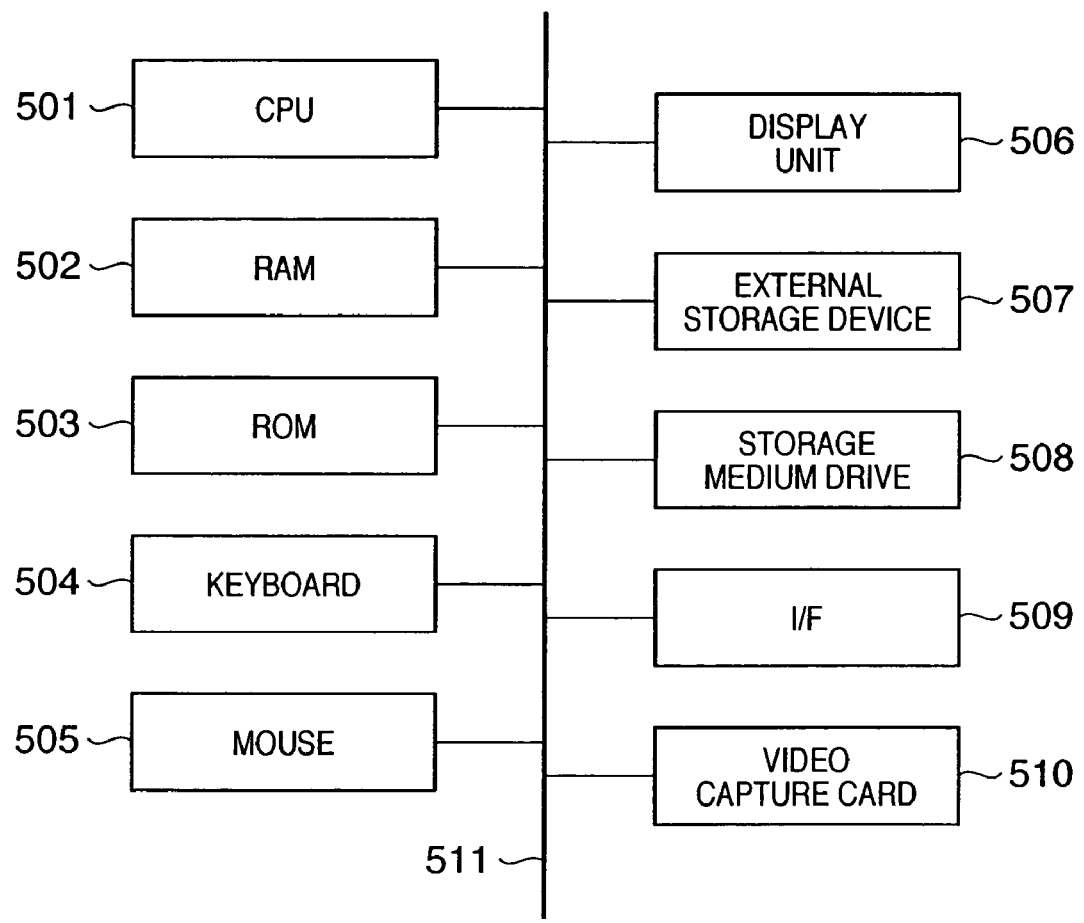
FIG. 8 is a block diagram showing the basic arrangement of a computer according to an embodiment of the present invention.

FIG. 8 shows the basic arrangement of a computer with the above arrangement. Reference numeral 501 denotes a CPU which controls the overall computer using programs and data stored in a RAM 502 and ROM 503, and executes the software modules to implement a series of processes for generating the mixed reality space image, and a series of processes for correcting the position, orientation, and field angle data of the image sensing unit 1.

The RAM 502 has an area for storing and holding programs and data loaded from an external storage device 507 and storage medium drive 508, and also an area (work area) required for the CPU 501 to execute various processes. The ROM 502 stores programs, data, character codes, and the like required to control the entire computer. Reference numerals 504 and 505 respectively denote a keyboard and mouse, which are used to input various instructions to the CPU 501.

Reference numeral 506 denotes a display unit, which can display the generated mixed reality space image, and also information required to correct the position, orientation, and field angle, and the like. The external storage device 507 serves as a large-capacity information storage device represented by a hard disk. The external storage device 507 also serves as the aforementioned marker data storage unit 5 and space data storage unit 8, and saves an OS (operating system), the marker data, the space data, a program required to generate a mixed reality space image, a program required to correct the position, orientation, and field angle of the image sensing unit 1, and the like. When the position and orientation data of the image sensing unit 1 are to be pre-stored, the external storage device 507 also stores data to be stored. The program and data saved in the external storage device 507 are loaded onto the RAM 502 in accordance with instructions from the CPU 501.

The storage medium drive 508 reads programs and data stored in a storage medium such as a CD-ROM, DVD-ROM, or the like, and outputs them to the external storage device 507 and RAM 502. Note that the programs and data saved in the external storage device 507 may be directly supplied from this storage medium drive 508 to the RAM 502.

Reference numeral 509 denotes an I/F, which can connect the position/orientation measuring unit 3, lens state acquisition unit 4, image display unit 11, and the like. The measurement results of the position/orientation measuring unit 3 and lens state acquisition unit 4 can be input via the I/F 509, and the generated mixed reality space image can be output to the image display unit 11 via the I/F 509. Reference numeral 510 denotes a video capture card, which receives a real space image sensed by the image sensing unit 1, converts the received real space image into a format compatible to programs which respectively serve as the position/orientation/field angle correction unit 7 and image composition unit 10, and outputs the converted image to the RAM 502. The video capture card 510 is connected to a bus 511 (to be described below) via an I/F (not shown). The bus 511 interconnects the aforementioned units.

Figure 9:
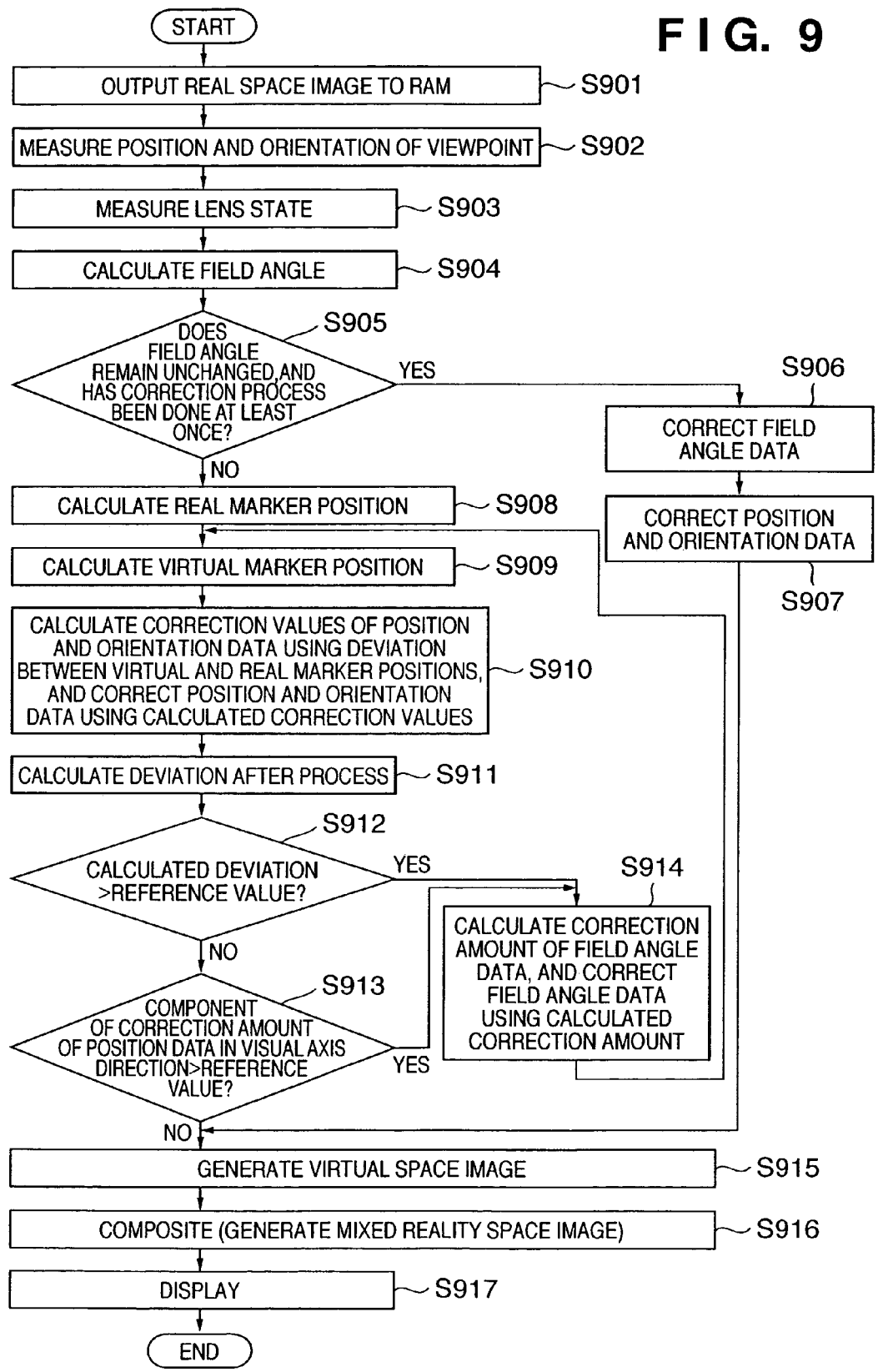
FIG. 9 is a flow chart of the process for correcting the position, orientation, and field angle of the image sensing unit 1, generating a mixed reality space image using the corrected position, orientation, and field angle, and displaying the generated image on the image display unit 11.

The process for calculating the correction amounts of the position, orientation, and field angle of the image sensing unit 1 using the aforementioned information processing apparatus will be described below. FIG. 9 is a flow chart showing the process for correcting the position, orientation, and field angle of the image sensing unit 1, generating a mixed reality space image using the corrected position, orientation, and field angle, and displaying the generated image on the image display unit 11. The process according to the flow chart of FIG. 9 is executed by the CPU 501. That is, a program that makes the CPU 501 execute the process according to the flow chart of FIG. 9 has been loaded onto the RAM 502. The CPU 501 executes this program to implement the process for correcting the position, orientation, and field angle of the image sensing unit 1, generating a mixed reality space image using the corrected position, orientation, and field angle, and displaying the generated image on the image display unit 11. In this case, assume that the programs of the aforementioned software modules have been loaded onto the RAM 502.

Upon reception of a real space image (including one or more markers) sensed by the image sensing unit 1, the video capture card 510 converts the received image into a format compatible to programs which respectively serve as the position/orientation/field angle correction unit 7 and image composition unit 10, and outputs the converted image to the RAM 502 (step S901).

Needless to say, since the real space image output onto the RAM 502 is obtained by applying various processes to the real space image sensed by the image sensing unit 1 in the video capture card 510, the image size is likely to have changed. This means that these images are likely to have different field angles. Also, the real space image output onto the RAM 502 is to be used when the CPU 501 executes the programs which respectively serve as the position/orientation/field angle correction unit 7 and image composition unit 10.

The position/orientation measuring unit 3 measures the position and orientation of the image sensing unit 1 (viewpoint), and outputs them to the RAM 502 (step S902). Note that the position/orientation measuring unit 3 may measure either the position or orientation of the image sensing unit 1, as described above, and data which is not measured may be held in, e.g., the external storage device 507 and may be loaded onto the RAM 502 in such case. Also, when the position/orientation measuring unit 3 measures neither the position nor orientation of the image sensing unit 1 but holds their data in advance, the position and orientation data of the image sensing unit 1 may be similarly held in the external storage device 507 and may be loaded onto the RAM 502.

The lens state acquisition unit 4 measures the lens state of the image sensing unit 1, and outputs the measured state as lens state data to the RAM 502 (step S903). The CPU 501 implements a field angle calculation process by executing the program that serves as the field angle calculation unit 6 (step S904). In this field angle calculation process, the field angle is calculated using the lens state data (rotation angle data of the lens in this case) output to the RAM 502 in step S903 by:

Field angle of image sensing unit $1 = A \times \exp(B \times \theta)$ where A and B are arbitrary constants, and $\theta$ is the rotation angle of the lens. Note that the calculation formula used to calculate the field angle is not limited to this.

It is checked if the field angle calculated in step S904 is different from the already calculated field angle (step S905). That is, it is checked if the field angle of the image sensing unit 1 has been changed. If the field angle remains unchanged, and if the processes in steps S908 to S914 have been executed at least once, the flow advances to step S906.

Steps S908 to S914 are processes for calculating the correction amounts of the field angle of the image sensing unit 1, storing the calculated correction amounts in the RAM 502, and correcting the field angle of the image sensing unit 1 using the stored correction amounts. Hence, if these processes have been executed at least once, and the field angle remains unchanged, since the correction amount of the field angle held in the RAM 502 can be used, the field angle of the image sensing unit 1 calculated in step S904 and held in the RAM 502 is corrected using the correction amounts of the field angle held in the RAM 502 in step S906. In step S907, the correction amounts of the position and orientation of the image sensing unit 1 are calculated, and the position and orientation of the image sensing unit 1 are corrected using the calculated correction amounts. This process is the same as those executed in steps S908, S909, and S910 to be described later. Since details of this process will be explained in the description of S908, S909, and S910, a description thereof will be omitted here.

The CPU 501 generates a virtual space image by executing the program that serves as the image generation unit 9 (step S915). More specifically, a virtual space image is generated using the corrected position, orientation, and field angle of the image sensing unit 1. Since the process for generating a virtual space image using the viewpoint position, orientation, and field angle uses a known 3D image processing technique, a description thereof will be omitted.

The CPU 501 implements a composition process of the real space image held in the RAM 502 in step S901, and the virtual space image generated in step S915, i.e., generates a mixed reality space image by executing the program that serves as the image composition unit 10 (step S916), and displays the generated mixed reality space image on the image display unit 11 (step S917).

On the other hand, if it is determined in step S905 that the field angle has been changed or the processes in steps S908 to S914 have not been executed yet, the flow advances to step S908. If the field angle has been changed (when the user has changed the zoom ratio using a switch or the like attached to the image sensing unit 1), or if the processes in steps S908 to S914 have not been executed yet, the already calculated correction amount data of the field angle of the image sensing unit 1 can no longer be used, or no correction amount data are available in the RAM 502. Hence, the following process for calculating the correction amounts of the field angle of the image sensing unit 1 is required. The process for calculating the correction amounts of the field angle of the image sensing unit 1 is executed as follows.

Prior to the process for calculating the correction amounts of the field angle, a process for calculating the correction amounts of the position and orientation of the image sensing unit 1, and correcting the position and orientation of the image sensing unit 1 using the calculated correction amounts is executed first. The CPU 501 calculates the positions of markers in the real space image input to the RAM 502 in step S901 by executing the program that serves as the position/orientation/field angle correction unit 7 (step S908). Since each marker is assigned with a specific color, the real space image is searched for that color of the marker, and the barycentric position of the corresponding color region is determined as the position of the marker in the image. Upon changing the zoom ratio, the size of each marker in the image changes. In this case as well, the barycentric position of the corresponding color region is similarly detected as the position of the marker in the image.

The CPU 501 loads marker data from the external storage device 507 or storage medium drive 508 onto the RAM 502, and sets markers specified by the marker data on the virtual space by executing the program that serves as the position/orientation/field angle correction unit 7. Then, the positions of markers on an image obtained when the virtual space is sensed from a virtual viewpoint with a photographing field angle determined by the field angle data calculated in step S904 at a position and orientation on the virtual space determined by the position and orientation data input to the RAM 502 in step S902 are calculated (step S909).

These positions are used as those of the virtual markers. That is, the positions calculated in step S909 are calculated as those of the markers on the real space image when a viewpoint that has the position and orientation obtained in step S902 and the field angle calculated in step S904 senses a real space.

Since a position on an image sensing plane (which is set in advance to be the same as that of the image sensing unit 1) upon sensing the markers from this viewpoint can be calculated by known matrix conversion using the position, orientation, and field angle of the viewpoint (virtual viewpoint) and the marker positions, a detailed description in this process will be omitted.

Figure 10:
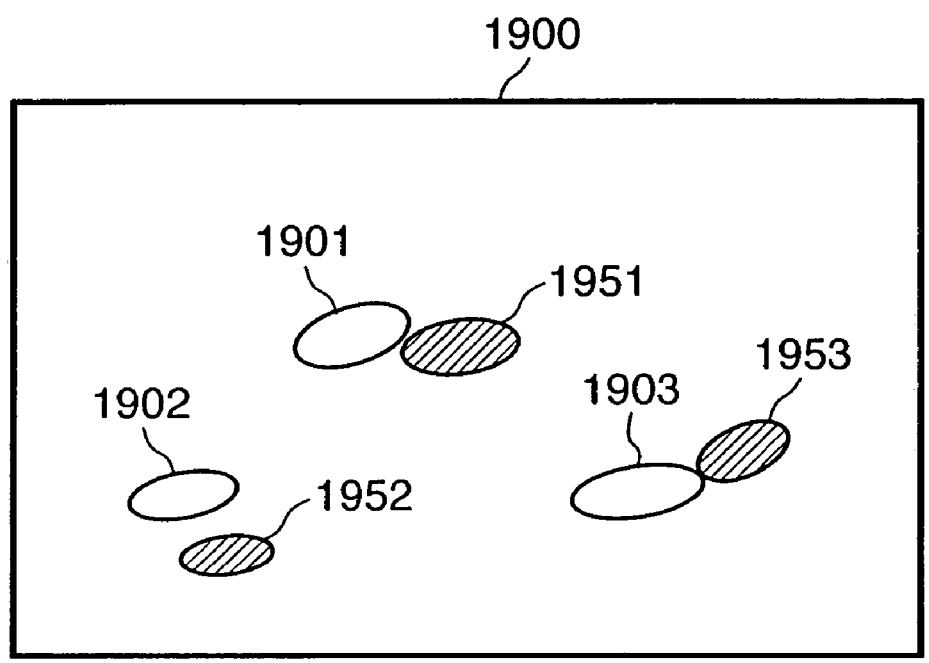
FIG. 10 shows the positions of real and virtual markers on the real space image.

FIG. 10 shows the real and virtual marker positions on the real space image. Reference numeral 1900 denotes a real space image; and 1901 to 1903, real markers sensed by the image sensing unit 1. Reference numerals 1951 to 1953 denote virtual markers which respectively correspond to the real markers 1901 to 1903, and are respectively located at the virtual marker positions calculated in step S908. In the subsequent process, the position and orientation data of the image sensing unit 1 are corrected to minimize all of an error between the positions of the real marker 1901 and virtual marker 1951, an error between the positions of the real marker 1902 and virtual marker 1952, and an error between the positions of the real marker 1903 and virtual marker 1953.

In this correction process, the CPU 501 compares the virtual and real marker positions on the real space image to calculate correction values of the position and orientation data that allow these positions to match, and adds the calculated correction values to the position and orientation data by executing the program that serves as the position/orientation/field angle correction unit 7 (step S910).

As a method of determining the correction values, the following methods may be used. That is, a deviation of the virtual marker position (the barycentric position of the positions of all virtual markers if there are a plurality of virtual markers in an image) from the corresponding real marker position (the barycentric position of the positions of all real markers if there are a plurality of real markers in an image) is added to position data as a correction value of the position data to change a viewpoint position on the virtual space, and the virtual marker position from the changed viewpoint is recalculated. After recalculation, the orientation of the virtual viewpoint is rotated about the direction perpendicular to the image plane so that the corresponding marker position overlaps the position of the real marker which is closest to the center of the image, and that rotation amount is determined as a correction value of the orientation data. Note that the order of the position and orientation correction-processes is not particularly limited, and if the real and virtual marker positions sufficiently match after one correction process, the other correction process may be skipped.

As another example of the method, the position and orientation data may be three-dimensionally corrected in directions to minimize the positional deviation of a virtual marker corresponding to each virtual marker position, and correction may be repeated until the positional deviation becomes equal to or smaller than a threshold value. In this example, since 3D correction is repeated, the finally obtained correction amount of the position data may contain a component in the direction perpendicular to the image plane.

Note that the method of calculating the correction values of the position and orientation data are not limited to the above methods.

Furthermore, if it is proved in advance that the position and orientation data obtained in step S902 have sufficiently high precision, the process in step S910 may be skipped. The calculated correction amounts of the position and orientation data are held in the RAM 502.

Note that the explanation of the processes in steps S908, S909, and S910 above becomes that of step S907 by replacing "field angle data calculated in step S904" by "field angle data corrected in step S906".

With the above process, the real and virtual marker positions match on the real space image approximately but not perfectly, and include some error. Then, this error is calculated (step S911). This error corresponds to a deviation vector (deviations in the vertical and horizontal directions of an image) between corresponding real and virtual markers. In the example shown in FIG. 10, a deviation vector between the markers 1901 and 1951, that between the markers 1902 and 1952, and that between the markers 1903 and 1953 are calculated.

The CPU 501 checks this error and determines whether or not the correction amounts of the field angle obtained from the field angle calculation unit 6 are to be calculated by executing the program that serves a the position/orientation/field angle correction unit 7 (step S912). As a reference for this checking process, the average value of the deviations (deviation vector sizes) between corresponding real and virtual markers is calculated, and it is determined whether or not this average value is larger than a predetermined reference value (predetermined threshold value).

If the average value is larger than the predetermined reference value, the flow advances to step S914 to calculate the correction amounts of the field angle data, and to add these correction amounts to the field angle data (step S914). The method of calculating the correction amounts of the field angle data will be described later.

On the other hand, if the average value is equal to or smaller than the predetermined reference value, the flow advances to step S913 to determine with reference to the correction amount of the position data, which is calculated in step S910 and is held in the RAM 502, whether or not the correction amounts of the field angle data are to be calculated. As a reference for this determination process, it is determined whether or not a component of the correction amount of the position data in the direction perpendicular to the image plane is larger than a predetermined reference value.

If the component of the correction amount of the position data in the direction perpendicular to the image plane is larger than the predetermined reference value, the flow advances to step S914 to calculate the correction amounts of the field angle data, and to add these correction amounts to the field angle data. In this case, it is determined in step S913 that the field angle data calculated in step S904 does not match the field angle of the real space image, but the real and virtual marker positions match by correcting the position data. Since the correction amounts of the field angle have different amounts in the vertical and horizontal direction of an image, the correction amounts are independently calculated in these directions.

Note that it is often impossible that the component of the correction amount of the position data in the direction perpendicular to the image plane assumes a value other than zero depending on the determination method of the correction values of the position and orientation data executed in step S910. In such case, the control skips step S913, and the flow jumps from step S912 to step S914.

The process for calculating the correction amounts of the field angle data will be described below. A method of calculating the correction amounts of the field angle data to be used when the average value of the deviation amounts between the corresponding real and virtual markers is larger than the predetermined reference value is different from that to be used when the component of the correction amount of the position data in the direction perpendicular to the image plane is larger than the predetermined reference value. Respective cases will be explained below.

<When Average Value of Deviation Amounts between Corresponding Real and Virtual Markers is Larger than Predetermined Reference Value>

In this case, this embodiment determines the correction values depending on the direction of the deviation vector calculated in step S911.

FIG. 2 is a view for explaining the method of calculating the correction amounts of the field angle data using the positions of virtual and real markers on the real space image. In FIG. 2, black dots indicate the position of the real markers, and triangles indicate those of the virtual markers on the real space image. For example, when the virtual marker positions have deviated from the real marker positions to the outer side of the image, as shown in FIG. 2, the field angle of the real space image is larger than the field angle data. Hence, in such case, the correction values of the field angle data are set to be positive values to match the real and virtual marker positions.

On the other hand, FIG. 3 is a view for explaining the method of calculating the correction amounts of the field angle data using the positions of virtual and real markers on the real space image in a case different from that in FIG. 2. In FIG. 3, black dots indicate the position of the real markers, and triangles indicate those of the virtual markers on the real space image. For example, when the virtual marker positions have deviated from the real marker positions to the inner side of the image, as shown in FIG. 3, the field angle of the real space image is smaller than the field angle data. Hence, in such case, the correction values of the field angle data are set to be negative values to match the real and virtual marker positions.

Note that the absolute values of the correction values have constant values in this embodiment, but may have values proportional to the average value of the deviation vector sizes (i.e., deviations).

The positional relationship between the real and virtual markers may be determined by comparing, e.g., the absolute values of the coordinate values of the real and virtual marker positions to have the image center as an origin. Let (Rx, Ry) be the position of arbitrary real marker R, and (Vx, Vy) be the position of corresponding virtual marker V (the horizontal direction agrees with the x-axis, and the vertical direction agrees with the y-axis). If |Rx|>|Vx|, it is determined that virtual marker V is located inside real marker R in the horizontal direction; if |Ry|<|Vy|, it is determined that virtual marker V is located outside real marker R in the vertical direction. If the same determination results are obtained for other markers, a negative correction value is added to field angle data in the horizontal direction, and a positive correction value is added to that in the vertical direction. If a given virtual marker is located inside the corresponding real marker, and another virtual marker is located outside the corresponding real marker, a total tendency is determined using the deviations and the like. For example, if a total of |Rx|−|Vx| that can be calculated for respective markers is positive, since the total tendency is |Rx|>|Vx|, it is determined that virtual markers V are located inside real markers R in the horizontal direction; if a total of |Ry|−|Vy| that can be calculated for respective markers is negative, since the total tendency is |Ry|<|Vy|, it is determined that virtual markers V are located outside real markers R in the vertical direction.

<When Component of Correction Amount of Position Data in Direction Perpendicular to Image Plane is Larger than Predetermined Reference Value>

In this case, the correction values of the field angle data are calculated in accordance with the direction of the correction value of the position data. For example, when the correction value of the position data is to largely correct the position data frontward in the visual axis direction, the field angle of the real space image is smaller than the field angle data. Hence, in such case, the correction amounts of the field angle data are set to be negative values to match the real and virtual marker positions. Conversely, when the correction value of the position data is to largely correct the position data backward in the visual axis direction, the field angle of the real space image is larger than the field angle data. Hence, in such case, the correction amounts of the field angle data are set to be positive values to match the real and virtual marker positions.

Note that the absolute value of the correction values has constant values in this embodiment, but may have values proportional to the component of the correction amount of the position data in the direction perpendicular to the image plane.

In either case, since the correction values of the field angle data can be calculated, the calculated value is held in the RAM 502 and is added to the field angle data to correct it.

Upon completion of the processes in steps S908 to S914, the flow returns to step S909 to repeat the subsequent processes using the corrected field angle data until the average value of the deviations between the corresponding real and virtual markers becomes smaller than the predetermined reference value, and the component of the correction amount of the position data in the direction perpendicular to the image plane becomes smaller than the predetermined reference value.

When the average value of the deviations between the corresponding real and virtual markers becomes smaller than the predetermined reference value, and the component of the correction amount of the position data in the direction perpendicular to the image plane becomes smaller than the predetermined reference value, the flow advances to step S915. Then, the virtual space image is generated, the mixed reality space image is generated, and the generated mixed reality space image is displayed on the image display unit 11, as described above.

Since the correction amounts of the field angle calculated by the above process are held in the RAM 502, the field angle of the image sensing unit 1 can be corrected using these correction amounts unless the field angle is changed.

As described above, the information processing apparatus of this embodiment can present a mixed reality space image in which the field angles of the real and virtual spaces approximately match can be presented to the user using the camera whose zoom ratio can be changed. Thus, even when an arbitrary position of the mixed reality space is zoomed up, a mixed reality space image in which the field angles of the real and virtual spaces approximately match can be presented to the user.

Even when the size of the sensed real space image has changed in a process for fetching that image into the computer, the correction process is done using the image with the changed size. In this case as well, the information processing apparatus according to this embodiment can present a mixed reality space image in which the field angles of the real and virtual spaces approximately match to the user.

That is, the position of an image on the real space can be appropriately adjusted to that of an image on the virtual space irrespective of the zoom ratio, and a high-quality mixed reality space image can be provided.

Note that the field angle correction process is, i.e., a focal length correction process.

[Second Embodiment]

In the process for calculating the correction values of the position, orientation, and field angle of the image sensing unit 1 according to the first embodiment, markers are used as feature points. These feature points need not be those which are set artificially, but may use arbitrary objects included in an image as long as their 3D coordinate positions on the real space are known.

In this case, a process for checking whether or not an object used as a feature point is contained in the image sensed by the image sensing unit 1 must be added to the process shown in FIG. 9. In this process, for example, an image (template image) of an object to be used as a feature point may be pre-stored in the external storage device 507 or the like, and matching between the real space image obtained from the image sensing unit 1 and the template image may be made to detect the object used as the feature point.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus for correcting a field angle of an image sensing device, which senses an image of a real space that includes a feature point whose position on the real space is known, comprising:

position detection unit adapted to detect a position of the feature point included in the image of the real space sensed by the image sensing device in that image;

measurement unit adapted to measure a position, orientation, and field angle of the image sensing device;

position calculation unit adapted to set a virtual viewpoint specified by the position, orientation, and field angle measured by said measurement unit, and calculating a position of the feature point, which is seen when the real space is viewed from that viewpoint, in the image;

first correction amount calculation unit adapted to calculate a correction amount of the position and/or a correction amount of the orientation of the image sensing device to minimize a deviation between the position detected by said position detection unit and the position calculated by said position calculation unit in the image sensed by the image sensing device; and second correction amount calculation unit adapted to calculate a correction amount of the field angle of the image sensing device in accordance with the deviation minimized by said first correction amount calculation unit or the correction amount of the position of the image sensing device calculated by said first correction amount calculation unit.

2. The apparatus according to claim 1, wherein said second correction amount calculation unit calculates the correction amount of the field angle of the image sensing device in accordance with a direction of the deviation minimized by said first correction amount calculation unit.

3. The apparatus according to claim 1, wherein said second correction amount calculation unit calculates the correction amount of the field angle of the image sensing device in accordance with a component of the correction amount of the position of the image sensing device in a visual axis direction of the image sensing device, which is calculated by said first correction amount calculation unit.

4. The apparatus according to claim 1, further comprising:

first correction unit adapted to correct data indicating the position and/or the orientation of the image sensing device using the correction amounts or amount calculated by said first correction amount calculation unit;

second correction unit adapted to correct data indicating the field angle of the image sensing device using the correction amount calculated by said second correction amount calculation unit;

image generation unit adapted to generate an image of an object whose position on a virtual space is known using the data indicating the field angle of the image sensing device which is corrected by said second correction unit or the data indicating the field angle of the image sensing device which is measured by said measurement unit, and data indicating the position and/or the orientation of the image sensing device, which are/is corrected by said first correction unit; and composition unit adapted to composite the image of the real space sensed by the image sensing device, and the image generated by said image generation unit, and outputting the composite image to a predetermined display device.

5. An information processing method for correcting field angle information of an image sensing device from a sensed image of a real space which includes a feature point whose position on the real space is known, comprising:

a position detection step of detecting a position of the feature point included in the image of the real space sensed by the image sensing device in that image;

a measurement step of measuring a position, orientation, and field angle of the image sensing device;

a position calculation step of calculating the position of the feature point in the image of the real space on the basis of position information, orientation information, and field angle information obtained in the measurement step, and the position of the feature point; and a field angle information correction step of correcting the field angle information measured in the measurement step to match the position of the feature point calculated in the position calculation step with the position of the feature point detected in the position detection step.

6. A program for making a computer execute an information processing method of claim 5.

7. A computer readable storage medium storing a program of claim 6.

8. An image composition apparatus which composites a real space image obtained by sensing a real space, and a virtual space image generated by a computer or the like, comprising:

an image sensing unit which is used to sense the real space image, and has a variable zoom ratio;

an image capture unit which captures the real space image;

a position/orientation measuring unit which acquires position data and orientation data of a photographing viewpoint of said image sensing unit;

a lens state acquisition unit which acquires lens state data of said image sensing unit;

a marker data storage unit which holds marker data used to specify a feature point set on the real space;

a field angle calculation unit which calculates field angle data of said image sensing unit from the lens state data;

a position/orientation/field angle correction unit which corrects the field angle data using the real space image, the marker data, the position data, and the orientation data;

a space data storage unit which holds space data that defines a virtual space;

an image generation unit which generates the virtual space image using the space data, the position data, the orientation data, and the field data;

an image composition unit which generates a mixed reality space image by compositing the real space image and the virtual space image; and an image display unit which displays the mixed reality space image.

9. The apparatus according to claim 8, wherein said position/orientation/field angle correction unit corrects the field angle data to match the field angle of the real space image with the field angle indicated by the field angle data.

10. The apparatus according to claim 8, wherein said position/orientation/field angle correction unit corrects the field angle data to match a position of the feature point on the real space, which appears in the real space image, with a position of the feature point on the virtual space, which is projected onto the virtual space image according to the marker data.

11. The apparatus according to claim 8, wherein said position/orientation/field angle correction unit corrects the position data and the orientation data.

12. The apparatus according to claim 11, wherein said position/orientation/field angle correction unit corrects the field angle data to minimize correction errors of the position data and the orientation data.

13. The apparatus according to claim 8, wherein said position/orientation measuring unit acquires the orientation data by measuring a orientation of the photographing viewpoint of said image sensing unit.

14. The apparatus according to claim 8, wherein said position/orientation measuring unit acquires the position data by measuring a position of the photographing viewpoint of said image sensing unit.

* * * * *

UNITED STATES PATENT AND TRADEMARK OFFICE
CERTIFICATE OF CORRECTION

PATENT NO. : 6,990,429 B2 Page 1 of 1
APPLICATION NO. : 10/738030
DATED : January 24, 2006
INVENTOR(S) : Mahoro Anabuki It is certified that error appears in the above-identified patent and that said Letters Patent is hereby corrected as shown below:

ON THE TITLE PAGE
At Item (56) Foreign Patent Documents, "JP 06-028451 * 4/1994" should read --JP 06-028451 * 2/1994--.

COLUMN 12
Line 21, "correction-processes" should read --correction processes--.

COLUMN 18
Line 38, "a" should read --an--.

Signed and Sealed this

Twenty-second Day of August, 2006

JON W. DUDAS
*Director of the United States Patent and Trademark Office*